Patented Mar. 7, 1933

1,900,536

UNITED STATES PATENT OFFICE

JOHN C. ZOLA, OF TARENTUM, PENNSYLVANIA, ASSIGNOR TO DUPLATE CORPORATION, A CORPORATION OF DELAWARE

LAMINATED GLASS

No Drawing.  Application filed March 3, 1931. Serial No. 519,897.

The invention relates to laminated glass which ordinarily consists of two sheets of glass and an interposed sheet of cellulose ester plastic, such as celluloid or cellulose acetate cemented together. Among the various cements heretofore employed are various forms of synthetic resins, such as the various condensation products. These cements have in general certain favorable characteristics, one of which is that the sheets will not separate due to the absorption of water by the cement, but they have certain undesirable properties, one of the difficulties with the synthetic and other resins being their tendency to become brittle and lose their holding power due to exposure to light in the course of time. Many of the resins also become yellow on exposure to light, thus impairing the transparency and appearance of the product. Further, celluloid composited with the resins has a marked tendency to show sheeter lines. The object of the present invention is to overcome the above objections heretofore incident to synthetic resins as binding agents in composite pyroxylin plastic and glass. More specifically, the objects of the invention are to provide a cement of the synthetic resin type, (1) which will, when used as a binder in composite glass, approximate in holding power the water soluble cements now commonly used, such as gelatin and casein, (2) which is suitable in color and which will not discolor objectionably with age, (3) which will not become brittle on exposure to light, but which will maintain its strength and resilience after a very long period of light exposure, and (4) which can be used in such a way as to give a composite glass product substantially free from blotches and sheeter lines.

The basic resin employed is one of the soluble plastic condensation products made by heating polyhydric alcohols, such as glycerol with aliphatic dibasic acids containing six or more carbon atoms in a normal straight chain, such as adipic acid or its higher homologues, the preferred one being that formed by heating glycerol with sebacic acid whose method of preparation is set forth in Patent No. 1,761,813. Other alternative condensation products of the same general type are set forth in said patent and may be used to advantage, the invention not being limited to the particular resin specified.

Resins of this type when used as binders in safety glass have a high degree of holding power; will not become brittle on exposure to light; and will maintain their strength and resilience after a long period of use. In many instances, however, laminated glass employing these adhesives alone show sheeter lines, and a further step in my invention consists in mixing or compounding the resin with other synthetic resins so as to eliminate this objection, while still preserving all the properties of the resin as a binder, as above set forth. Among the synthetic resins which may be mixed with the basic condensation product above described to secure the desired result are a number of other glycerine polybasic acid condensation resins, synthetic resins of the phenol formaldehyde group, toluene sulfonamide derivatives, and ester gum. Generally speaking, however, the field is confined to resins or gums which are known to be durable or have other desirable properties as adhesives. The proportions of these mixing resins which are compounded with the basic condensation product will vary depending upon the particular resin used. In many cases a mixture of equal parts of the two resins gives excellent results, such as equal parts of a glycerol sebacic acid condensation product and one of the other glycerine polybasic condensation products. As typical of resins of the last mentioned class suitable for mixing with the basic condensation product, reference is made to those whose production is described in the patents to Arsem 1,098,777, Howell 1,098,728, and Weber 1,690,515.

The basic resin is ordinarily compounded with 60 per cent toluol to 40 per cent resin which renders it relatively soft and plastic. This compound with the mixing resin is dissolved in any suitable solvent of the two resins in order to apply it to the sheets to be secured together. A solvent which has been found satisfactory consists of 45 per cent of heavy naphtha, 45 per cent of toluol, and 10 per cent of ethyl acetate. The percentage of resin in the solvent may range from 1 to 20 per cent, good results being obtained with a total concentration of 5 per cent of the two resins in the solvent mixture above specified, one half of such 5 per cent being basic resin and one half mixing resin. However, as before indicated, the relative proportions of the two resins working up the total concentration may be varied within a considerable range depending on the kind of mixing resin employed. It will be understood that the invention is not limited to the use of one modifying resin with the basic resin, but one such modifying resin is all that is required to secure the desired result and eliminate the sheeter lines.

In compositing the sheets of glass and cellulose ester plastic, the solution carrying the basic resin or the basic resin plus the modifying resin is sprayed onto the surfaces of the glass sheets in a thin film or coat, and allowed to remain exposed to the atmosphere until dry in appearance, after which the glass sheets are applied to the plastic sheet and the sandwich is exposed to heat and pressure such as that ordinarily used in compositing laminated glass using the common adhesives, such as gelatin and casein.

The invention is not limited to synthetic resins for mixing with the basic resin, as some natural resins, such as Canada balsam, elemi, dammar, pontianak and manila may be used for accomplishing the desired result, but the synthetic resins are much preferred because of their greater holding power.

What I claim is:

1. A laminated plate comprising a pair of glass sheets, an interposed sheet of cellulose ester plastic and a joining layer of material between each of the glass sheets and the sheet of plastic comprising the condensation product produced by heating a polyhydric alcohol with a dibasic aliphatic acid containing six or more carbon atoms in a normal straight chain.

2. A laminated plate comprising a pair of glass sheets, an interposed sheet of cellulose ester plastic and a joining layer of material between each of the glass sheets and the sheet of plastic comprising the condensation product produced by heating a polyhydric alcohol with sebacic acid.

3. A laminiated plate comprising a pair of glass sheets, an interposed sheet of cellulose ester plastic and a joining layer of material between each of the glass sheets and the sheet of plastic comprising the condensation product produced by heating glycerol with sebacic acid.

4. A laminated plate comprising a pair of glass sheets, an interposed sheet of cellulose ester plastic and a joining layer of material between each of the glass sheets and the sheet of plastic comprising a mixture of a condensation product produced by heating a polyhydric alcohol with an aliphatic dibasic acid containing six or more carbon atoms in a normal straight chain and another synthetic resin.

5. A laminated plate comprising a pair of glass sheets, an interposed sheet of cellulose ester plastic and a joining layer of material between each of the glass sheets and the sheet of plastic comprising a product produced by heating glycerol with sebacic acid and mixing the same with another synthetic resin.

6. A laminated plate comprising a pair of glass sheets, an interposed sheet of cellulose ester plastic and a joining layer of material between each of the glass sheets and the sheet of plastic comprising a mixture of a condensation product produced by heating a polyhydric alcohol with an aliphatic dibasic acid containing six or more carbon atoms in a normal straight chain and another polyhydric alcohol polybasic acid condensation product.

7. A laminated plate comprising a pair of glass sheets, an interposed sheet of cellulose ester plastic and a joining layer of material between each of the glass sheets and the sheet of plastic comprising a mixture of a condensation product produced by heating a polyhydric alcohol with an aliphatic dibasic acid containing six or more carbon atoms in a normal straight chain and a resin of the phenol formaldehyde group.

8. A laminated plate comprising a pair of glass sheets, an interposed sheet of cellulose ester plastic and a joining layer of material between each of the glass sheets and the sheet of plastic comprising a mixture of a condensation product produced by heating a polyhydric alcohol with an aliphatic dibasic acid containing six or more carbon atoms in a normal straight chain and a resin of the toluene sulfonamide group.

9. A laminated plate comprising a pair of glass sheets, an interposed sheet of cellulose ester plastic and a joining layer of material between each of the glass sheets and the sheet of plastic comprising a mixture of a condensation product produced by heating a polyhydric alcohol with an aliphatic dibasic acid containing six or more carbon atoms in a normal straight chain and ester gum.

10. A laminated plate comprising a pair of glass sheets, an interposed sheet of cellulose ester plastic and a joining layer of material between each of the glass sheets and the sheet of plastic comprising a mixture of a condensation product produced by heating a polyhydric alcohol with an aliphatic dibasic acid containing six or more carbon atoms a normal straight chain and a resin.

11. A laminated plate comprising a pair of glass sheets, an interposed sheet of cellulose ester plastic and a joining layer of material between each of the glass sheets and the sheet of plastic comprising a mixture of the condensation product formed by heating a polyhydric alcohol with sebacic acid and another polyhydric alcohol polybasic acid condensation product.

12. A laminated plate comprising a pair of glass sheets, an interposed sheet of cellulose ester plastic and a joining layer of material between each of the glass sheets and the sheet of plastic comprising a mixture of the condensation product formed by heating a polyhydric alcohol with sebacic acid and a resin of the phenol formaldehyde group.

13. A laminated plate comprising a pair of glass sheets, an interposed sheet of cellulose ester plastic and a joining layer of material between each of the glass sheets and the sheet of plastic comprising a mixture of the condensation product formed by heating a polyhydric alcohol with sebacic acid and a resin of the toluene sulfonamide group.

14. A laminated plate comprising a pair of glass sheets, an interposed sheet of cellulose ester plastic and a joining layer of material between each of the glass sheets and the sheet of plastic comprising a mixture of the condensation product formed by heating a polyhydric alcohol with sebacic acid and ester gum.

15. A laminated plate comprising a pair of glass sheets, an interposed sheet of cellulose ester plastic and a joining layer of material between each of the glass sheets and the sheet of plastic comprising a mixture of the condensation product formed by heating a polyhydric alcohol with sebacic acid and a natural resin.

In testimony whereof, I have hereunto subscribed my name this 29th day of Jan., 1931.

JOHN C. ZOLA.